Nov. 12, 1968

C. H. MOULTON 3,411,039

OVERCURRENT PROTECTIVE MEANS INCLUDING SOLID STATE
POWER SUPPLY SENSING MEANS

Filed May 16, 1966

Inventor
Clifford H. Moulton
By Thomas F. Kirby
Attorneys

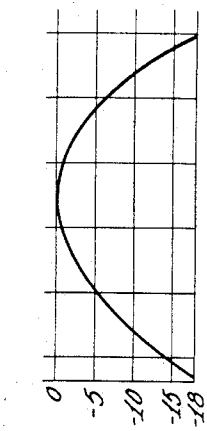
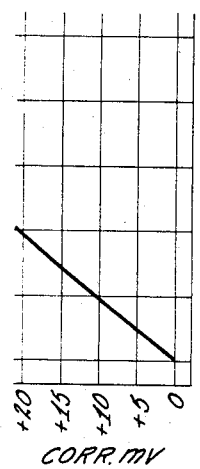
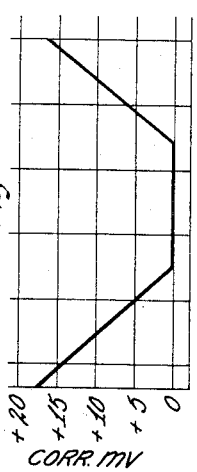
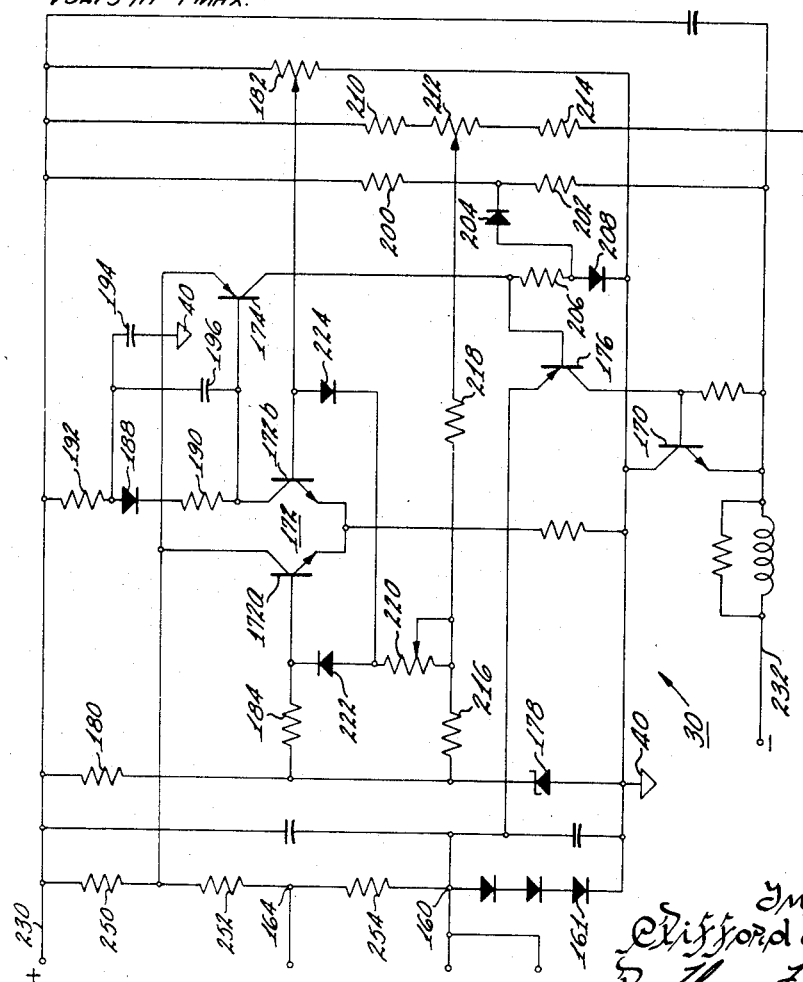

United States Patent Office 3,411,039
Patented Nov. 12, 1968

3,411,039
OVERCURRENT PROTECTIVE MEANS INCLUDING SOLID STATE POWER SUPPLY SENSING MEANS
Clifford H. Moulton, Portland, Oreg., assignor to Allis - Chalmers Manufacturing Company, Milwaukee, Wis.
Filed May 16, 1966, Ser. No. 550,551
2 Claims. (Cl. 317—33)

ABSTRACT OF THE DISCLOSURE

The means for sensing and measuring line current and producing an output signal based thereon in a high voltage electrical system are driven by a first power supply and a second power supply. In accordance with the invention, an unlocking circuit is provided to control appearance of the output signal in response to the relationships between the two power supplies. Thus, if either or both power supplies are operating above a predetermined level, the unlocking circuit is unlocked and the output signal is able to appear. However, if both power supplies are operating below a predetermined level, the unlocking circuit is locked and the output signal is unable to appear. The unlocking circuit comprises a multivibrator and a control circuit which governs the on-off condition of the multivibrator.

---

This invention relates generally to means for locking and unlocking electrical circuits in response to conditions in a plurality of power supplies which drive said circuits.

The invention is employed to particular advantage in a system having means for sensing line current and producing a voltage signal which is an analog thereof, converting the voltage signal into a coded pulsed current signal, converting the pulsed current signal into pulsed light intelligence, transmitting the light intelligence from a high potential region to a low potential region by optical means, receiving and decoding the pulsed light intelligence and converting it into an output signal for use in line current measuring and in line protective equipment.

More specifically, the means for sensing and measuring line current comprise a metering transformer coupled to the line for providing a voltage analog of line current. The voltage analog signal is fed to a solid state coder which converts it into a pulse rate modulated current signal for operating light emitting means, such as a gallium arsenide diode, to provide a pulse rate modulated light signal. The metering transformer and coder are located in a region of high potential. The light signal is transmitted by dielectric optical means from a region of high potential near the line to a receiver means in a region of lower or ground potential. The receiver means comprises a photo transistor and amplifier means for converting the coded light signal into an output signal which is an analog of line current. The coder is powered by a first power supply comprising a transformer which is coupled to the line and furnishes power for operation during normal operation and fault conditions. The coder is also adapted to be powered by a second power supply comprising a transformer which is connected to the transmission line and through an impedance to ground. Power supply regulating means, including temperature compensating means, are provided for both power supplies. An unlocking circuit in accordance with the present invention is provided to control energization of the light emitting means from the coder in response to relationships of the two power supplies. Unlock circuit operates to lock only when both power supplies are below predetermined operating levels. Both power supplies, the regulating means, and the unlocking circuit are also located in the high potential region.

It is an object of the present invention to provide improved means for sensing and measuring current in high potential electrical transmission lines and which have improved means for locking and unlocking electrical circuits in response to conditions in a plurality of power supplies which drive said circuits.

Another object is to provide such means which are smaller, less cumbersome, substantially less costly, and more accurate than conventional current transformers.

Another object is to provide such means wherein a dielectric separation is maintained between the components near the line and those at ground potential.

Another object is to provide such means which operate from line energy but impose no significant energy drain on or distortion in the system being monitored.

Another object is to provide such means which are shielded from high energy stray transient conditions which interfere with conventional current transformer operations.

Another object is to provide such means which can monitor up to 120,000 amperes peak current.

Another object is to provide such means which, when closing or reclosing a circuit breaker on a short circuit, provide full intelligence output in less than two milliseconds.

Another object is to provide such means which in responding from zero to 100% line load (and up to 25 times the normal full current) retain a very high degree of accuracy over the complete range.

Another object is to provide such means which provide revenue accuracy current measurements under wide ambient temperature conditions from —70° F. to +200° F. and from line charging through full fault current levels.

Another object is to provide such means which incorporate improved means for providing temperature compensation of the electronic circuitry.

Other objects and advantages of the invention will hereinafter appear.

The accompanying drawings illustrate a preferred embodiment of the invention but it is to be understood that the embodiments illustrated are susceptible of modifications with respect to details thereof without departing from the scope of the appended claims.

In the drawings:

FIG. 2 is a graph depicting the normal operating characteristic of a Zener diode employed in the temperature compensating portion of the power supply regulating means of the circuit;

FIG. 3 is a graph depicting the normal operating characteristic of a temperature compensated silicon resistor employed in the temperature compensating portion of the power supply regulating means of the circuit;

FIG. 4 is a graph depicting the correction curve resulting from the action of steering diodes on the characteristic of the resistor described in connection with FIG. 3; and FIG. 5 is a graph depicting the reference voltage resulting from the cooperation of the Zener diode, the temperature compensated silicon resistor, and the steering diodes.

Figure 1:
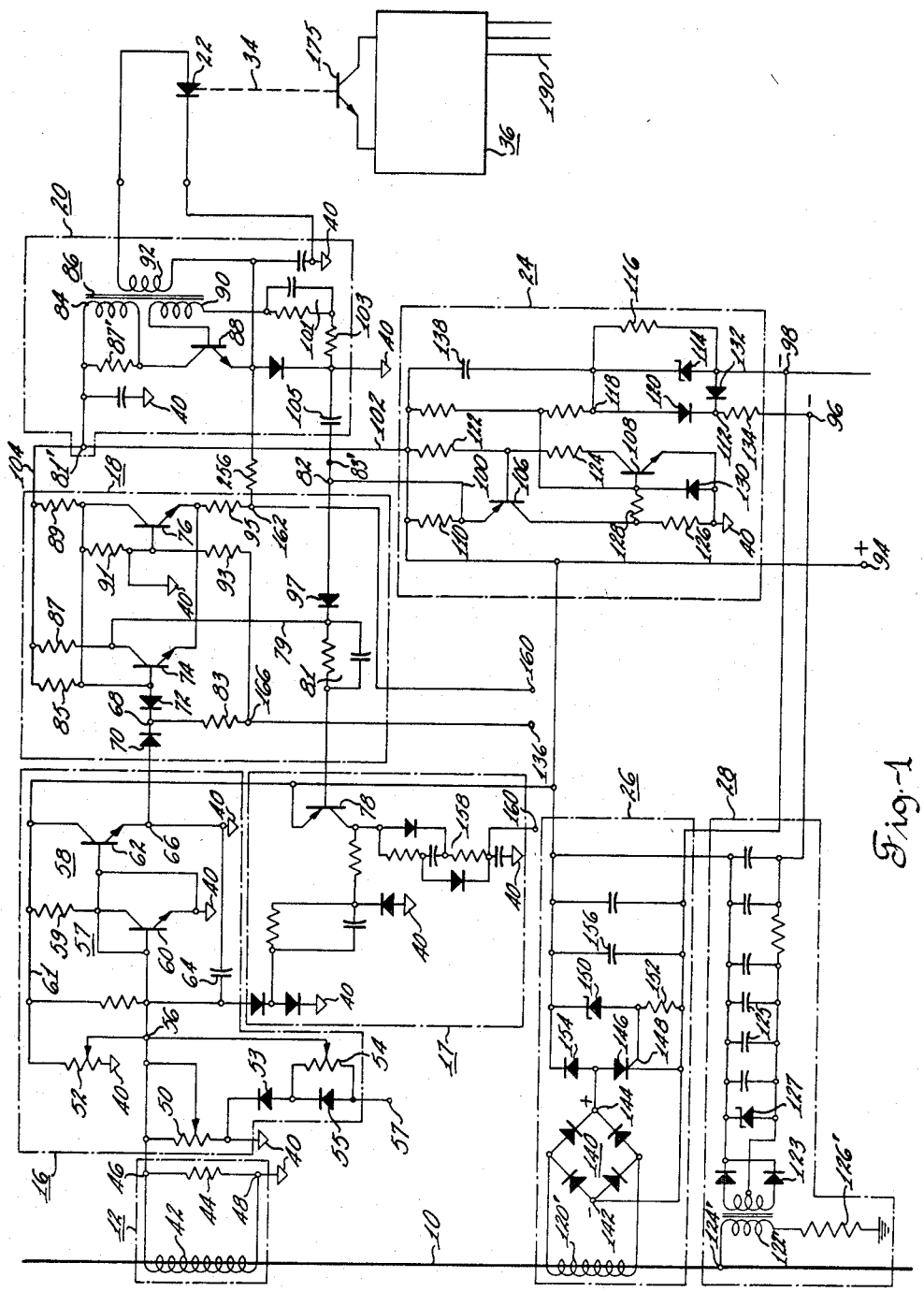
FIG. 1 is a schematic view of the circuitry of the present invention and is broken into two portions and extended over two sheets of drawings.

In the drawings the numerals 94, 136, 98, and 82 in FIG. 1 on the first sheet correspond to the numerals 230, 164, 232 and 83', respectively, in FIG. 1 on the second sheet.

Referring to FIG. 1 of the drawings, the numeral 10 designates a high voltage electrical power transmission line. Only one line is shown, but it is to be understood to be part of a multiphase system such as a three-phase system. The system of which line 10 is a part is understood to be capable of operating at a high potential in the range, for example, of from 230 to 700 kilovolts. In operation, line 10 is understood to be surrounded by a region of high potential.

In accordance with the present invention, means are provided for sensing and measuring electrical conditions in line 10 and for providing an output signal which can be used, for example, to control circuit breakers or other apparatus (not shown) for controlling or monitoring the system.

I. General arrangement

The aforesaid means comprise sensing means 12, coder means comprising an integrator circuit 16, a charge dispenser circuit 17, and a restrained multivibrator circuit 18, a blocking oscillator circuit 20, current responsive light emitting means 22, an unlocking circuit 24, power supply means comprising a first power supply 26 and a second power supply 28, a power supply regulating circuit 30 comprising temperature compensating means, light transmission means 34, and light receiving means 36. As will be understood, all of the foregoing components except light receiving means 36 are in close physical association with transmission line 10 and electrically connected thereto as indicated by the symbol designated by numeral 40 so as to be at substantially the same voltage as the line to thereby eliminate the need for dielectric protection from the line. The points 40 are internal circuit grounds which are at line potential and not at transmission line ground. Light receiving means 36 is at a lower potential than line 10, most usually at ground potential, and is able to remain in this condition because light transmitting means 34 is a dielectric.

II. Sensing means

Current sensing means 12 comprises a metering transformer 42 which is coupled to line 10 and has a shunt resistor 44 connected across its output terminals 46 and 48. Output terminal 48 is grounded to point 40 as hereinbefore explained. Output terminal 46 provides a voltage signal which is an analog of line current. In practice, transformer 12 may be a physically small 10,000 to 1 step-down transformer. The output signal from output terminal 46 of sensing means 12 is fed to integrator circuit 16.

III. Coder

The coder comprises an integrator circuit 16, a charge dispenser circuit 17, and a multivibrator circuit 18. The coder is adapted to receive the voltage signal from sensing means 12 and to convert it into a pulsed current output signal which has a frequency which is related to line current in line 10. Integrator circuit 16 comprises a calibration potentiometer 50 to adjust signal modulation magnitudes, a frequency adjustment potentiometer 52 to set the frequency for zero line current at some predetermined frequency such as, for example, 67.5 kilocycles, and temperature compensating diodes 53 and 55 which are regulated by a potentiometer 54 for keeping the desired frequency constant in view of temperature changes. The signal current appearing at point 56 in integrator circuit 16 is fed to an integrator 57 comprising an amplifier 58 and capacitor 64. Amplifier 58 comprises a grounded emitter transistor 60 and a grounded collector transistor 62 as the output stage. A resistor 59 is connected between transistor 60 and supply line 61 and the signal voltage appear across resistor 59. A capacitor 64 is connected between point 56 and the emitter of transistor 62. Capacitor 64 is adapted to be charged by the signal appearing at point 66 and discharges periodically. Capacitor 64 is adapted to charge and discharge periodically at a selected rate of 67,500 cycles per second, for example, which rate varies in accordance with changes in current flow in line 10. This causes a pulsating output current signal to appear at output terminal 66 from capacitor 64.

Terminal 66 is connected to input terminal 68 of multivibrator circuit 18 through a diode 70. Diode 70 and a diode 72 on the other side of point 68 cooperate to provide a restraint on multivibrator circuit 18. More particularly, multivibrator circuit 18 is free-running except that a restraining bias is imposed by diode 72 and a resistor 83. Appearance of a signal current from output terminal 66 of integrator 16 removes the restraint imposed by diodes 70 and 72 allowing it to run one cycle for each pulse from the integrator. Multivibrator circuit 18 comprises a first transistor 74 which has its base connected through diode 72 to point 68 and further comprises a second transistor 76 which is emitter coupled to transistor 74. A resistor 85 forward biases the base of transistor 74 against the restraint imposed by diode 72. Resistor 87 supplies collector current to transistor 74. Resistor 89 supplies collector current to transistor 76. The resistors 91 and 93 supply bias current to transistor 76. An emitter return resistor 95 is connected to the emitter of transistor 74 or 76. The resistors 83 and 93 are connected to an output terminal 136 of power supply regulating means 30 which provides, for example, 12.6 (+) volts. A diode 97 permits multivibrator 18 to drive blocking oscillator 20 if unlock circuit 24 is in the unlocked state. The collector of transistor 74 is connected to the base of a transistor 78 in charge dispenser circuit 17. The pulsed voltage output of transistor 74 in multivibrator 18 feeds back to transistor 78 through line 79 and an R-C network 81 to effect recharging of capacitor 64 in integrator 16. The R-C network 81 converts the pulsed voltage to a pulsed current signal for transistor 78 base. There is a balance maintained between the feed-back signal from transistor 78 and the input signal to transistor 60 of integrator 16. Thus, if a fault occurs in line 10 the discharge frequency of capacitor 64 must necessarily change to maintain the balance and this results in the occurrence at output terminal 66 of integrator 16 of a pulsed current signal, the frequency of which is directly related to current flow in line 10. A corresponding output frequency signal appears across the output terminal 82 of multivibrator 18.

IV. Blocking oscillator

Blocking oscillator circuit 20 comprises an input terminal 83' which is connected to output terminal 82 of multivibrator 18. A first winding 84 of a ferrite cup core transformer 86 is shunted by a resistor 87' and connected in series with the collector-emitter circuit of a transistor 88 and comprises part of the light driver blocking oscillator 20. The base of transistor 88 is connected through a second winding 90 of transformer 86 to input terminal 83' of oscillator 20 through a biasing R–C network 101, through a biasing resistor 103, and coupling capacitor 105. A third winding 92 of transformer 86 is connected across the terminals of the current responsive light emitting means 22 to effect operation of the latter. In practice, light emitter 22 may take the form of a gallium arsenide diode which emits infrared radiation when a driving current is applied across its terminals. The blocking oscillator is a monostable device which pulses light emitting means 22 once for each pulse received at input terminal 83'. The blocking oscillator serves to provide a high energy input into diode 22 when triggered by the relatively low energy triggering input at 83'.

V. Unlocking circuit

Current from output terminal 82 of multivibrator 18 to input terminal 83' of blocking oscillator 20 is controlled by unlocking circuit 24. As hereinafter explained, unlocking circuit 24 is responsive to the operating relationship of the power supplies 26 and 28. Normally, when one or both power supplies are operated, unlocking circuit 24 is unlocked and does not inhibit the signal from multivibrator 18 to blocking oscillator 20. In practice, a predetermined voltage or current on line 10 effects energization of power supply 28 or 26, respectively, and effects unlocking operation of unlocking circuit 24. Unlocking circuit 24 comprises power supply signal input terminals 94, 96 and 98. The input terminals 94 and 98 of unlocking circuit 24 are connected across the output terminals of power supply 26, hereinafter described. The input terminals 96 and 98 of unlocking circuit 24 are connected across the output terminals of power supply 28.

Unlocking circuit 24 further comprises a signal output terminal 100 and a power supply input terminal 102 connected to a power supply bus 104 which, for example, is at 27 volts. A transistor 106 (PNP) and a transistor 108 (NPN) are complementary connected to provide a bistable multivibrator or flip-flop circuit. Normally, circuit 24 is unlocked, that is to say, both transistors 106 and 108 are off or nonconducting. In this condition point 82 is connected to bus 104 through a resistor 110 and point 82 tries to approach the voltage of bus 104. This causes diode 97 to be forward biased and permits the pulsed signal from multivibrator circuit 18 to enter oscillator circuit 20 at input terminal 83'. Unlocking circuit 24 is adapted so that if both power supplies 26 and 28 fall below a predetermined output voltage (caused by deenergization of line 10), then point 82 drops in voltage and reverse biases diode 97 thereby preventing the pulsed signal from multivibrator circuit 18 from entering oscillator circuit 20.

A drop in output voltage from either power supply 26 or 28 alone does not cause unlocking circuit 24 to lock for the following reasons. For example, if the output voltage across output terminals 94 and 98 of power supply 26 drops (i.e., if terminal 98 becomes more positive with respect to point 94), then the voltage to a point 112 in unlocking circuit 24 (and the voltage to a point 118 through a diode 120) is supplied by power supply 28 through input terminal 96 thereby maintaining unlocking circuit 24 unlocked. Conversely, if the output voltage of power supply 28 drops, then power supply 26 supplies voltage through a Zener diode 114 and a resistor 116 to point 118 thereby maintaining the circuit unlocked. However, if both power supplies 26 and 28 fail, then point 118 approaches the voltage level of point 94 causing the base of transistor 108 to turn on that transistor thereby causing transistor 106 to turn on and causes point 82 to drop in voltage and reverse bias diode 97.

The resistors 122 and 124 are part of the power supply return path for the collector of transistor 108 as well as the base bias and signal path for transistor 106. The collector of transistor 106 is connected through a resistor 126 to point 40. A resistor 128 is the signal feedback path from transistor 106 to the base of transitsor 108. A diode 130 serves as a reverse voltage trap for transistor 108 base and prevents excessive reverse biasing of transistor 108.

A capacitor 138 serves to control any ripple or fast fluctuation of power supply voltage which may cause unlocking circuit 24 to operate. The relatively long time constant of capacitor 138 is important in this respect.

VI. *Power supply*

Temperature compensating regulating power supply means comprising power supplies 26 and 28 are provided for operating integrator 16, multivibrator 18, circuit 17, oscillator circuit 20 and unlocking circuit 24. Power supply 26 comprises a saturable current transformer 120' which is coupled to line 10 and is adapted to supply power under normal load conditions and fault conditions which may occur in line 10. As hereinafter explained, the output of transformer 120' is suitably rectified and filtered to provide, for example, an output of approximately 35 volts across the output terminals of power supply 26.

Power supply 26 is adapted to supply power to the same components as power supply 28 when short circuit conditions in line 10 render power supply 28 inoperative. It may be assumed that power supply 26, which is a current operated power source, provides for full signal output from the coder in about ½ millisecond when either closing or reclosing a circuit breaker on a short circuit. The entire sensing and measuring means becomes operative in approximately 1.7 milliseconds or 1/10 of a cycle in line 10. Thus, the time required for actuation is well below the first current loop peak in line 10 so that any monitoring equipment relying on the output signal has more than adequate time to ascertain current surge in line 10 to determine if a voltage exists.

The output terminals of transformer 120' of power supply 26 are connected to the input terminals of a full wave rectifier bridge 410. Output terminals 142 and 144 of bridge 140 serve, for example, as negative and positive output terminals, respectively of power supply 26. Since current in line 10 fluctuates widely, it is necessary that power supply 26 be adapted to provide a reasonably constant voltage output. Accordingly, a controlled rectifier 146 is connected across output terminals 142 and 144 of bridge 140 and has its gate 148 connected between a Zener diode 150 and a resistor 152 which are series connected across the output terminals 142 and 144 of bridge 140 through a diode 154. On a positive going ripple, the voltage of terminal 144 of bridge 140 increases toward its peak value. This charges a capacitor 156 through diode 154 and cause Zener diode 150 to conduct at its reverse breakdown point thereby raising the voltage on gate 148 of controlled rectifier 146 and causes the latter to conduct. Conduction of controlled rectifier 146 causes a short circuit across the output of bridge 140 thereby reducing the bridge output voltage to zero. It is to be understood that transformer 120' has high impedance and inherently limits its own current flow to a safe value while controlled rectifier 146 is conducting. When controlled rectifier 146 conducts, diode 154 becomes reverse biased and allows capacitor 156 to retain its charge for use in supplying the output terminals of power supply 26. During fault conditions in line 10, current may rise to ten times normal level, but the saturating characteristic of transformer 120' and the limiting function of the aforedescribed circuit limits the output voltage of power supply 26 to a predetermined operating level.

Power supply means 28 comprises a current transformer 122' which has one side of its primary connected to line 10, as at point 124', and has its other end connected through a suitable impedance 126' to ground. In practice, the impedance is embedded in high voltage insulating means. The output from the secondary winding of transformer 122' is understood to be suitably rectified through diodes 123 and filtered through capacitors 125 to provide an output, for example, of 35 volts DC at the output terminals of power supply 28. Power supply 28 takes its energy from line 10 through an impedance 126' to ground and thus provides power for the unit continuously so that the system is always operating when there is potential on the line, as on the energized side of a circuit breaker.

Means are provided to limit the peak output voltage from power supply 28. A Zener diode 127 clamps the peak output voltage lever of power supply 28 and the excess voltage is dropped through impedance 126'.

With power source 26 or 28 in operation, the components are in operation and unlocking circuit 24 is in unlocked condition. There are conditions when each power source is essential. For example, during a short circuit on line 10 line voltage drops until power supply 28 becomes inoperative or insufficient. As hereinbefore noted, unlocking circuit 24 will only allow an output signal from multivibrator circuit 18 to blocking oscillator 20 provided there is adequate margin between the unregulated power supply voltage and the regulated coder-supply bus.

VII. Power supply regulating circuit

The power supply regulating circuit 30 shown in FIG. 1 is adapted to provide precisely controlled and regulated output from power supplies 26 and 28. The output terminals of power supplies 26 and 28 are connected to a positive input terminal 230 and a negative input terminal 232 of regulating circuit 30.

Regulating circuit 30 is provided with output terminals 40 (which is ground) and 230. A voltage dividing network comprising resistors 250, 252 and 254, and a resistor 256, transformer winding 92, and light diode 22 is connected between output terminals 230 and 40. Three diodes 158 are connected between terminal 40 and a point 160 as a protective means in the event that the light diode circuit opens. An output terminal 160, having an output of 1.2 volts, for example, is connected to a point 162 between the resistors 95 and 256 in multivibrator circuit 18 and oscillator circuit 20, respectively. Output terminal 160 is also connected to a point 158 in charge dispenser circuit 17. Another output terminal 164, having a 12.6 volt output, for example, is connected to a junction point 166 between resistors 83 and 93.

It it to be noted that the voltage between terminals 40 and 230 is the voltage to be regulated. This is accomplished by controlling a power transistor 170 which has its emitter-collector circuit connected between terminals 232 and 40, respectively. The means for effecting control or regulation of transistor 170 comprises a dual chip NPN transistor 172 having two matched transistor elements 172a and 172b and which drives a PNP transistor 174. Transistor 174 drives a PNP transistor 176 which in turn drives or controls power transistor 170. Increasing or decreasing the base current of transistor 170 increases or decreases the voltage drop between the terminals 40 and 232. This maintains constant voltage between terminals 40 and 230 regardless of voltage changes between terminals 230 and 232 or load current changes between terminals 230 and 40.

A Zener diode 178 serves as the reference voltage for the regulated supply and is connected across terminals 40 and 230 through a resistor 180. Means are provided to compare a sample of the output voltage across terminals 40 and 230 with the reference voltage of the Zener diode 178. Such means comprise a potentiometer 182 which is connected across terminals 40 and 230 and has its tap connected to the base of transistor 172b for sampling purposes. The base of transistor 172a is connected to a point between Zener diode 178 and resistor 180 through a resistor 184. If the regulated voltage between the terminals 40 and 230 deviates from its desired value, an error signal appears at the collector of transistor 172b to drive the base of transistor 174 and causing the latter's collector to drive the base of transistor 176, thereby causing the latter's collector to control the base of power transistor 170. This effects a correction of the regulated output voltage between terminals 40 and 230.

One side of a diode 188 is connected through a resistor 190 to the collector of transistor 172b. The other side of diode 188 is connected through a resistor 192 to terminal 230. Diode 188 serves as a temperature compensating means to offset variations caused by temperature to which the base-emitter junction of transistor 174 is exposed. Capacitors 194 and 196 are provided to limit the frequency response of the network and improve its stability.

Means are provided to initiate operation of the power supply regulating circuit 30 when line 10 is first energized. Such means comprise resistors 200 and 202 which are connected in series across the terminals 130 and 132. A diode 204 is connected between resistors 200 and 202 on one side and has its other side connected through a resistor 206 to the base of transistor 176. When terminals 230 and 232 are first energized, diode 204 conducts to increase the base current of transistor 176 thereby turning on transistor 176, which in turn turns on transistor 170 causing energization of the entire circuit 30. A diode 208 is connected between point 40 and a point between resistor 206 and diode 204 to protect transistor 176 in the event of excessive transient voltage.

In practice, Zener diode 178 is provided with inherent temperature compensation and is rated at 10 parts per million per degree centigrade temperature coefficient. Accordingly, ambient temperature changes between —55° C. to +95° C. would result in errors greater than 0.1%. Regulating circuit 30 is designed to assure even greater accuracy by compensating for residual Zener voltage variations due to temperature. This reduces the voltage error by an additional factor of 10. Zener diode 178 may, for example, be a type MIL–1N994A diode which tends to attain a maximum output voltage at a temperature within the range of 40° C. above or below room temperature. Output voltage of Zener diode 178 falls off at the high and low temperature extremes, as FIG. 2 shows. A correction technique described as "END COMPENSATION" as adopted for the extreme temperature ranges and has a separate adjustment technique for the "mid-temperature" characteristics of the particular Zener diode. Outside of the ends of a "mid-temperature" plateau, correction is increased linearly toward either extreme temperature.

A resistor network comprising a resistor 210, a potentiometer 212 and a temperature sensitve silicon resistor 214 (having a positive temperature coefficient) is connected between terminal 230 and through diode 55 and 53 to point 40. Another resistor network comprising resistors 216 and 218 is connected between the anode of Zener diode 178 and the tap of potentiometer 212. A rheostat 220 is connected to a point between resistors 216 and 218 and to a point between a pair of steering diodes 222 and 224 which are connected to the bases of the transistors 172a and 172b.

Correction voltage is generated by a temperature-sensitive silicon resistor 214 which provides rising voltage with temperature in the range of 6 to 13 volts, for example, as FIG. 3 shows. The Zener diode 178 itself provides the reference voltage for one end of a divider consisting of resistors 216 and 218 in series. The silicon resistor 214 provides a reference voltage for the other end of the divider through potentiometer 212. Silicon diodes 222 and 224 steer the resulting temperature-variable signal from the resistor network 216 and 218 either through transistor 172a base or through transistor 172b base, as FIG. 4 shows. At high temperatures, one diode 224 couples a temperature correction current to the base of transistor 172b, bringing the power supply output back to the mid-temperature level. At a low temperature the opposite steering diode 222 introduces a temperature correcting current into the transistor 172a base so that output from the power supply is restored to the voltage at mid-temperature even with the lower Zener terminal voltage, as FIG. 5 shows.

Potentiometers 212 and 220 are factory adjustable to compensate for variation in the tolerances of Zener diode 178 and silicon resistor 214 and other components associated therewith. Potentiometer 212 superimposes the correction curve symmetrically over the temperature curve of Zener diode 178. Rheostat 220 adjusts the slope of the ends of the correction curve. Resistor 184 isolates the correction signal from diode 222 from Zener diode 178.

VIII. Light transmission and light receiving means

Light transmission means 22 which in practice is a gallium arsenide diode comprises a PN junction diode with a window. Since the optic light transmission device 34 is made of dielectric material, it does not violate the dielectric conditions which must be maintained between line 10 and the components associated therewith and components at ground level.

Light receiving means 36 comprises photo transistor 175 which is adapted to be responsive to light transmitted through the optic means 34 from light emitting diode 22. Photo transistor 175 is understood to be connected in a suitable circuit which is adapted to amplify the electrical current output produced by the impinging pulsating light and to change it into a useful electrical output signal from light receiving means 36 which is adaptable for use to operate circuit breakers, meters and other apparatus for monitoring or controlling current conditions in line 10.

The invention disclosed herein has been described in connection with a single line of a multiphase transmission system. In practice, it is preferable for reliability reasons to duplicate certain of the circuit modules described herein. Furthermore, in an actual multiphase system it may be desirable to provide apparatus according to the present invention for each line of the multiphase system.

The embodiments of the invention in which an exclusive property or privilege is claimed are defined as follows:

1. In an electrical system,
   a first power supply for providing a predetermined output,
   a second power supply for providing a predetermined output,
   and an unlocking circuit connected to and responsive to said first and second power supplies for providing a first control signal when at least one power supply is providing its predetermined output and for providing a second control signal when both power supplies are providing less than their predetermined outputs,
   said unlocking circuit comprising a bistable multivibrator having a pair of interconnected transistors,
   said first and second control signals appearing at an electrode of said transistors,
   said unlocking circuit further comprising a control circuit connected to said power supplies and responsive to the outputs thereof for effecting energization and deenergization of said multivibrator to provide said control signals.

2. A system according to claim 1 wherein said bistable multivibrator comprises PNP and NPN transistors which are connected so that the base of the PNP transistor is connected to the collector of the NPN transistor and so that the base of the NPN transistor is connected to the collector of the PNP transistor, wherein said first and second control signals appear at the emitter of the PNP transistor, and wherein said control circuit is also connected to the base of the NPN transistor.

References Cited
UNITED STATES PATENTS

| | | | |
|---|---|---|---|
| 3,122,697 | 2/1964 | Kander | 317—33 |
| 3,340,432 | 9/1967 | Ainsworth | 317—27 |

JOHN F. COUCH, *Primary Examiner.*

R. V. LUPO, *Assistant Examiner.*